Patented Dec. 3, 1946

2,411,968

UNITED STATES PATENT OFFICE 2,411,968

PROCESS FOR THE PREPARATION OF SYNTHETIC DL-TOCOPHEROLS

Paul Karrer, Zurich, and Otto Isler, Basel, Switzerland, assignors to Hoffmann-La Roche Inc., Nutley, N. J., a corporation of New Jersey No Drawing. Application August 12, 1941, Serial No. 406,554. In Switzerland March 31, 1938

10 Claims. (Cl. 260—333)

The present invention relates to a process for the preparation of synthetic tocopherols which are racemic with respect to carbon atom 2 of the chromane ring.

This application is a continuation-in-part of our application Serial No. 231,846, filed September 26, 1938.

Evans and collaborators (Mem. Univ. California, vol. 8, year 1927) discovered that a nutritive factor which is indispensable for spermatogenesis in male rats and the successful completion of an existing pregnancy in female rats is contained in wheat germ oil and various foodstuffs. They named the new biological factor vitamin E and described a biological method of determination using female rats. Evans, Emerson and Emerson (J. Biol. Chem., vol. 113, year 1936, page 319, and vol. 122, year 1937, page 99), succeeded in isolating three distinct chemical substances from wheat germ oil and various other vegetable oils which are responsible for the vitamin E action of the starting materials. These closely related compounds were named α-, β- and γ-tocopherols. Investigations by Fernholz (J. Amer. Chem. Soc., vol. 59, year 1937, page 1154; vol. 60, year 1938, page 700), Karrer and collaborators (Helvetica Chimica Acta, vol. 20, year 1937; page 1422; vol. 21, year 1938, page 309), Bergel, Todd and collaborators (Biochem. J., vol. 31, year 1937, page 2257; J. Chem. Soc., year 1938, page 253), as well as John and collaborators (Zeitschrift für physiologische Chemie, vol. 250, year 1937, page 11; vol. 252, year 1938, pages 201, 208) confirm and supplement the knowledge of the first-named investigators regarding tocopherols.

Natural α-tocopherol was characterized by the empirical formula $C_{29}H_{50}O_2$, by an allophanate melting at 158° C., by a p-nitrophenylurethane melting at 131° C., and by a sublimate of durohydroquinone on thermal decomposition. β-Tocopherol possesses the empirical formula $C_{28}H_{48}O_2$, yields an allophanate melting at 143–144° C. and a sublimate of trimethylhydroquinone on thermal decomposition. An allophanate melting at 135° C. was produced from γ-tocopherol which has the empirical formula $C_{28}H_{48}O_2$.

It has now been found that by reacting trimethylhydroquinone or dimethylhydroquinone with phytol under acid conditions, and preferably in the presence of acid condensing agents, compounds can be obtained which contain a heterocyclic ring and which must be regarded as chromane derivatives of the general formula

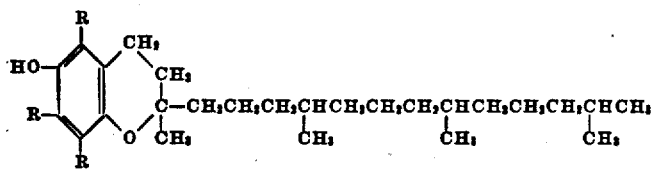

wherein two of the R radicals are methyl and the other is methyl or hydrogen. The reaction may, for example, be carried out in the presence of anhydrous zinc chloride, formic acid or while passing gaseous hydrogen chloride through the reaction mixture. It has also been found particularly suitable to employ a combination of zinc chloride and hydrogen chloride.

The new compounds are the racemates, with respect to carbon atom 2 of the chromane ring, of tocopherols obtained from natural raw materials. They are light yellow, slightly viscous oils which, in the cold, gradually reduce alcoholic silver nitrate solution. On heating the reduction proceeds quickly. These oils dissolve in concentrated sulphuric acid with a yellow color and the solutions fluoresce intensively after a few hours' exposure to ultra violet light. The solution of the compounds in chloroform yields a deep dark brown coloration on the addition of tetranitromethane, which gradually clears up. On thermal decomposition the compounds form sublimates of durohydroquinone or trimethylhydroquinone. When rats so far kept on a vitamin E-free diet were given these synthetic compounds, it could be established that they rendered it possible for a litter of healthy young rats to be born exactly as did tocopherols isolated from natural products.

The new compounds are to be used as pharmaceutical preparations or as starting materials for the manufacture of pharmaceutical preparations.

*Example 1*

4 parts by weight of phytol, 2.5 parts by weight of trimethylhydroquinone and 1 part by weight of anhydrous zinc chloride are heated to 180° C. in a current of nitrogen for half an hour. The suspended matter gradually gives a homogeneous brown solution whereby a little hydrogen chloride escapes and a small quantity of trimethylhydroquinone sublimes. The product is now cooled, precipitated with water, a lot of ether added, the ether solution washed with water, a solution of caustic soda, and water, dried and the solvent evaporated. The extract is dissolved in petroleum ether and adsorbed on an aluminium-oxide column. The chromatogram is developed with much petroleum ether. The upper uniformly grey zone contains the condensation product. This is eluted by a mixture of methanol and ether and purified by the preparation of a second chromatogram. The following condensation product is thereby obtained in a pure state:

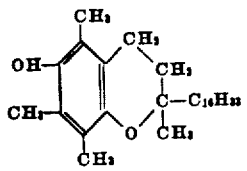

The new compound from trimethylhydroquinone and phytol contains 80.9 per cent of carbon and 11.8 per cent of hydrogen. The determination according to Zerewitinoff indicates the presence of one active hydrogen atom, i. e., a phenolic hydroxyl group. The compound possesses a characteristic absorption spectrum with a maximum absorption at 294 $\mu\mu$ and a minimum absorption at 256 $\mu\mu$. It forms various crystalline derivatives, such as a p-nitrophenyl-urethane melting at 131° C., an allophanate melting at 172° C., and a 3,5-dinitro benzoic ester melting at 63° C. On administering a dose of 3 mg. to a rat kept on a vitamin E-free diet, the full action of the pure vitamin was observed.

Example 2

4 parts by weight of phytol, 2.2 parts by weight of trimethylhydroquinone and 1 part by weight of anhydrous zinc chloride are suspended in 10 parts by weight of decaline and then heated to 150–160° C. for one hour while stirring and introducing carbon dioxide. The trimethylhydroquinone dissolves completely, whereby the liquid becomes yellowish brown. The product is cooled, water and ether added with stirring, the ether solution washed successively with water, a solution of caustic soda, hydrochloric acid, and water, dried with sodium sulphate and the ether evaporated. The residue is adsorbed on an aluminium-oxide column. After development of the chromatogram with a good deal of petroleum ether, the column is uniformly grey. At the foot thereof there is a violet zone. The grey main zone is eluted with a mixture of methyl alcohol and ether (3:1), the solvent evaporated and the extract further purified by the preparation of a second chromatogram. The product is then distilled in a molecular distillation apparatus and the compound described in the previous example obtained. This compound was given in doses of 3 and 10 mg. each to four rats which had been kept on a diet free from vitamin E. All the animals carried the pregnancy to term and brought forth healthy young.

Example 3

11 parts by weight of phytol, 5 parts by weight of trimethylhydroquinone and 60 parts by weight of anhydrous formic acid are boiled together for four to five hours under reflux. The product is then diluted with water, extracted with ether, the ether evaporated and the residue saponified with an alcoholic solution of sodium ethylate or alcoholic potash. When the alcohol has been distilled off, the crude dl-α-tocopherol is extracted from the alkaline mixture with ether. The ether solution is washed and dried. The solvent is then evaporated and the residue fractionated in high vacuum at a pressure of $10^{-3}$–$10^{-4}$ mm. A small preliminary fraction evaporating at 80–90° C. is separated; the principal quantity of the compound evaporates at 110–120° C. It is identical with the compound obtained in accordance with Examples 1 and 2.

Example 4

4 parts by weight of phytol, 2.5 parts by weight of 3,5-dimethylhydroquinone and 1 part by weight of anhydrous zinc chloride are heated to 180° C. for one-half an hour while stirring and introducing carbon dioxide. The suspended matter gradually fuses giving a homogeneous brown melt. After cooling, the product is treated with ether and water, the ether solution washed with potash and water, and the ether residue adsorbed on an aluminium oxide column. The chromatogram is developed with much petroleum ether. The whole of the lower part of the column is whitish-grey. The top layer of aluminium oxide, which is hardly colored, is removed and the whitish-grey principal zone eluted with a mixture of methyl alcohol and ether (3:1). The solvent is evaporated in vacuo and the residue distilled in a molecular distillation apparatus. The compound is a yellow, slightly viscous oil, $n_D^{25}=1.501$. A sublimate of trimethylhydroquinone results on thermal decomposition. An allophanate melting at 143° C. is obtained with cyanic acid in benzene solution. A 5 mg. dose of this compound was biologically fully active.

Example 5

4 parts by weight of phytol, 2.5 parts by weight of 3,5-dimethylhydroquinone and 1 part by weight of zinc chloride are suspended in 10 parts by weight of decaline and then heated to 150° C. for one hour while heating and introducing carbon dioxide. The m-xylohydroquinone dissolves completely. The fluid becomes yellowish-brown. The product is cooled, water and ether added while stirring, the ether solution washed with water, potash, hydrochloric acid and water, dried with sodium sulphate and the ether evaporated. The residue is adsorbed on an aluminium oxide column. After developing the chromatogram with much petroleum ether, the column appears almost uniformly yellowish-grey. At the bottom there is a small yellow zone. The yellowish-grey principal layer is eluted, the solvent evaporated and the residue purified by the preparation of a second chromatogram. The product is then distilled in a molecular distillation apparatus and the compound described in Example 4 is obtained.

Example 6

4 parts by weight of phytol, 2 parts by weight of 2,5-dimethyl hydroquinone and 1 part by weight of zinc chloride are heated to 180° C. for one-half hour while stirring and introducing carbon dioxide. When the material has become homogeneous, it is cooled, treated with ether and water and the ether solution washed with potash, then with water, the ether layer separated, dried, and the ether removed by distillation. The residue is taken up in small volume of low boiling petroleum ether and chromatogramed on an aluminium oxide column. By eluting the yellowish top zone with a mixture of ether and methanol, an oil is obtained which reduces a neutral solution of an alcoholic solution of silver nitrate on boiling. The material corresponds to the structure:

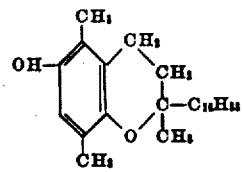

Its allophanate melts at 154° C.

Example 7

11 parts by weight of phytol, 5 parts by weight of 2,3-dimethyl hydroquinone, 60 parts by weight of anhydrous formic acid are refluxed together for four to five hours. The product is then diluted in water, extracted with ether, the ether evaporated, the residue saponified with an alcoholic solution of sodium methylate or alcoholic potash. When the alcohol has been distilled off, the residual product is extracted with ether and the ether solution washed and dried. The ether is removed and the residue is taken up in a small quantity of low boiling petroleum ether and chromatogramed on an aluminium oxide column. This gives a yellow-brownish layer in the upper part of the absorption column which on elution contains the expected condensation product consisting of a viscous oil with strong reducing action. The analysis corresponds to the formula $C_{28}H_{48}O_2$. It possesses an active hydrogen atom and corresponds to the structure:

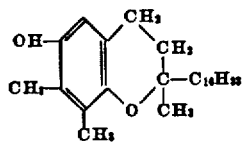

The allophanate thereof melts at 146° C. When tested on rats which had been kept on a vitamin E-free diet, the compound was fully active in a dose of 10 mg.

Example 8

2 parts by weight of zinc chloride, 10 parts by weight of phytol, and 5 parts by weight of trimethyl hydroquinone are dissolved in a mixture of 20 parts by volume of ether and 20 parts by volume of benzol, maintaining a temperature of 45–55° C. Dry hydrochloric gas is passed through the mixture until complete saturation which requires from two to four hours. The reaction liquid is then washed with water, then with hydrochloric acid, again with water, then with sodium chloride solution and finally the ether-benzol solution is dried and the solvents removed. The material is then worked up as in previous examples.

While we have described herein some embodiments of our invention, we wish it to be known that we do not intend to limit ourselves thereby, except within the scope of the appended claims.

We claim:

1. In a process for the manufacture of a tocopherol product, the steps of producing a tocopherol of the formula

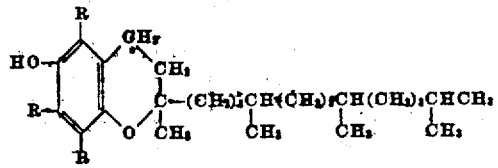

wherein two of the R radicals represent a methyl group and the third R radical a radical selected from the group consisting of hydrogen and methyl radicals, by condensing a methyl substituted hydroquinone of the formula

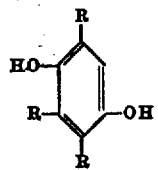

wherein two of the R radicals represent a methyl group and the third R radical represents a radical selected from the group consisting of hydrogen and methyl radicals, with phytol under acid conditions, and recovering a tocopherol product from the reaction mixture thus obtained.

2. In a process for the manufacture of a tocopherol product, the steps of producing a tocopherol of the formula

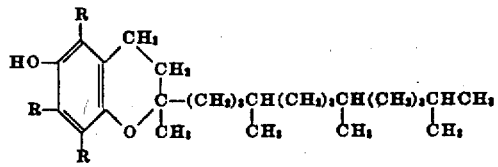

wherein two of the radicals R represent a methyl group and the third R radical represents a radical selected from the group consisting of hydrogen and methyl radicals, by condensing a methyl substituted hydroquinone of the formula

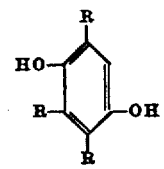

wherein two of the R radicals represent a methyl group and the third R radical represents a radical selected from the group consisting of hydrogen and methyl radicals, with phytol in the presence of zinc chloride, and recovering a tocopherol product from the reaction mixture thus obtained.

3. In a process for the manufacture of a tocopherol product, the steps of producing a tocopherol of the formula

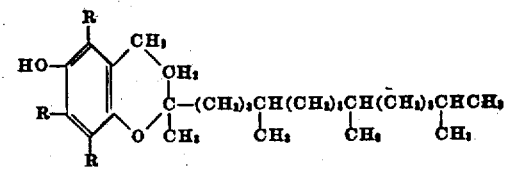

wherein two of the R radicals represent a methyl group and the third R radical represents a radical selected from the group consisting of hydrogen and methyl radicals, by condensing a methyl substituted hydroquinone of the formula

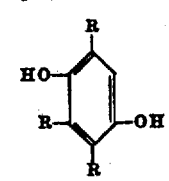

wherein two of the R radicals represent a methyl group and the third R radical represents a radical selected from the group consisting of hydrogen and methyl radicals, with phytol in the presence of zinc chloride, a solvent, while passing gaseous hydrogen chloride through the mixture, and recovering a tocopherol product from the reaction mixture thus obtained.

4. In a process for the manufacture of a tocopherol product, the steps of producing an α-tocopherol of the formula

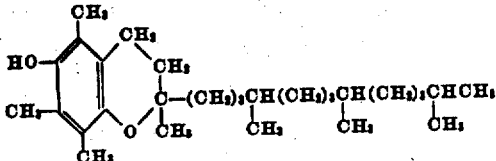

which comprises condensing trimethylhydroquinone with phytol under acid conditions, and recovering a tocopherol product from the reaction mixture thus obtained.

5. In a process for the manufacture of a tocopherol product, the steps of producing an α-tocopherol of the formula

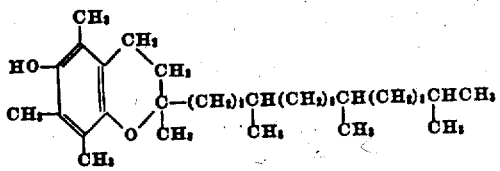

which comprises condensing trimethylhydroquinone with phytol in the presence of zinc chloride, and recovering a tocopherol product from the reaction mixture thus obtained.

6. In a process for the manufacture of a tocopherol product, the steps of producing a tocopherol of the formula

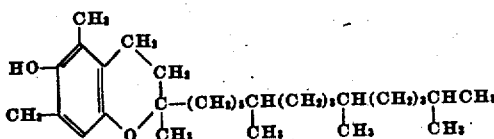

which comprises condensing 3,5-dimethylhydroquinone with phytol under acid conditions, and recovering a tocopheral product from the reaction mixture thus obtained.

7. In a process for the manufacture of a tocopherol product, the steps of producing a tocopherol of the formula

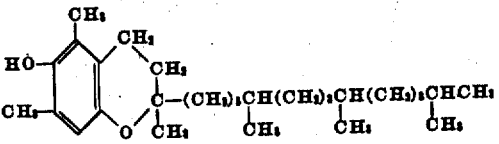

which comprises condensing 3,5-dimethylhydroquinone with phytol in the presence of zinc chloride, and recovering a tocopherol product from the reaction mixture thus obtained.

8. In a process for the manufacture of a tocopherol product, the steps of producing a tocopherol of the formula

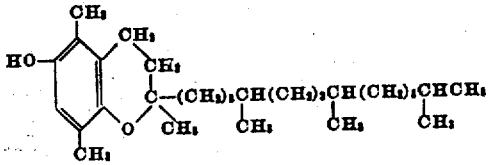

which comprises condensing 2,5-dimethylhydroquinone with phytol under acid conditions, and recovering a tocopherol product from the reaction mixture thus obtained.

9. In a process for the manufacture of a tocopherol product, the steps of producing a tocopherol of the formula

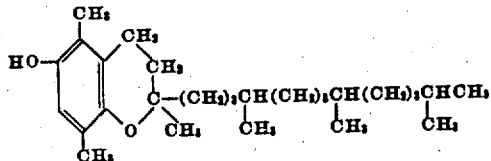

which comprises condensing 2,5-dimethylhydroquinone with phytol in the presence of zinc chloride, and recovering a tocopherol product from the reaction mixture thus obtained.

10. A process for producing a tocopherol-like chroman compound which comprises heating phytol, trimethyl hydroquinone and a solvent, in the presence of an acidic catalyst and in an atmosphere of a substantially inert gas.

PAUL KARRER.
OTTO ISLER.

Certificate of Correction

PAUL KARRER ET AL.

It is hereby certified that error appears in the patent issued to the above named inventors on December 3, 1946, requiring correction as follows: In the grant, upper right hand corner, for the patent number "2412968" read 2411968; and that the said Letters Patent should be read with this correction therein that the same may conform to the record of the case in the Patent Office.

Signed and sealed this 25th day of February, A. D. 1947.

[SEAL]

LESLIE FRAZER,
*First Assistant Commissioner of Patents.* ence of zinc chloride, a solvent, while passing gaseous hydrogen chloride through the mixture, and recovering a tocopherol product from the reaction mixture thus obtained.

4. In a process for the manufacture of a tocopherol product, the steps of producing an α-tocopherol of the formula

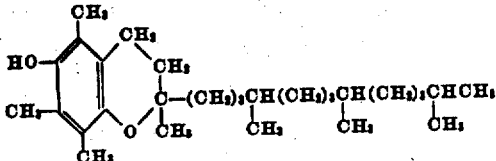

which comprises condensing trimethylhydroquinone with phytol under acid conditions, and recovering a tocopherol product from the reaction mixture thus obtained.

5. In a process for the manufacture of a tocopherol product, the steps of producing an α-tocopherol of the formula

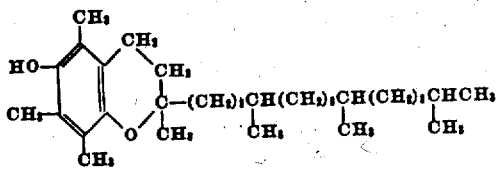

which comprises condensing trimethylhydroquinone with phytol in the presence of zinc chloride, and recovering a tocopherol product from the reaction mixture thus obtained.

6. In a process for the manufacture of a tocopherol product, the steps of producing a tocopherol of the formula

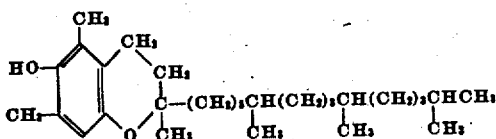

which comprises condensing 3,5-dimethylhydroquinone with phytol under acid conditions, and recovering a tocopheral product from the reaction mixture thus obtained.

7. In a process for the manufacture of a tocopherol product, the steps of producing a tocopherol of the formula

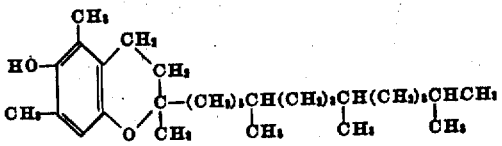

which comprises condensing 3,5-dimethylhydroquinone with phytol in the presence of zinc chloride, and recovering a tocopherol product from the reaction mixture thus obtained.

8. In a process for the manufacture of a tocopherol product, the steps of producing a tocopherol of the formula

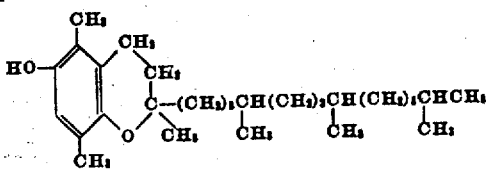

which comprises condensing 2,5-dimethylhydroquinone with phytol under acid conditions, and recovering a tocopherol product from the reaction mixture thus obtained.

9. In a process for the manufacture of a tocopherol product, the steps of producing a tocopherol of the formula

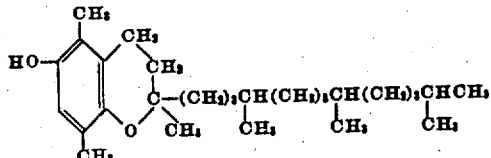

which comprises condensing 2,5-dimethylhydroquinone with phytol in the presence of zinc chloride, and recovering a tocopherol product from the reaction mixture thus obtained.

10. A process for producing a tocopherol-like chroman compound which comprises heating phytol, trimethyl hydroquinone and a solvent, in the presence of an acidic catalyst and in an atmosphere of a substantially inert gas.

PAUL KARRER.
OTTO ISLER.

Certificate of Correction

PAUL KARRER ET AL.

It is hereby certified that error appears in the patent issued to the above named inventors on December 3, 1946, requiring correction as follows: In the grant, upper right hand corner, for the patent number "2412968" read 2411968; and that the said Letters Patent should be read with this correction therein that the same may conform to the record of the case in the Patent Office.

Signed and sealed this 25th day of February, A. D. 1947.

[SEAL]

LESLIE FRAZER,
*First Assistant Commissioner of Patents.*